US 6,549,146 B2

(12) United States Patent  (10) Patent No.: US 6,549,146 B2
Bailey  (45) Date of Patent: Apr. 15, 2003

(54) TIMING APPARATUS HAVING A GEAR INCORPORATING A TIMING RING AND METHOD OF MANUFACTURING THE SAME

(75) Inventor: Geoffrey Paul Bailey, Stafford (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 09/839,769

(22) Filed: Apr. 20, 2001

(65) Prior Publication Data

US 2002/0011942 A1 Jan. 31, 2002

(30) Foreign Application Priority Data

Apr. 25, 2000 (GB) .............................. 0009860

(51) Int. Cl.⁷ ............................. H03M 1/22; G01B 7/30
(52) U.S. Cl. ................................. 341/15; 324/207.25
(58) Field of Search .................... 123/406.58, 90.17, 123/406.59; 324/173, 207.22, 207.25; 341/15; 74/143, 395; 28/279; 474/152; 318/254; 418/61.2, 53

(56) References Cited

U.S. PATENT DOCUMENTS

| 3,651,701 | A | * | 3/1972 | Holzer et al. ................. 74/143 |
| 3,886,916 | A | * | 6/1975 | Henderson ............. 123/406.59 |
| 3,964,141 | A | * | 6/1976 | Dunnell et al. ................ 28/279 |
| 4,008,987 | A | * | 2/1977 | Ritchie ......................... 418/53 |
| 4,233,592 | A |   | 11/1980 | Leichle |
| 4,235,101 | A |   | 11/1980 | Stadelmann |
| 4,258,471 | A |   | 3/1981 | Jacobson |
| 4,305,072 | A |   | 12/1981 | Makita |
| 4,321,869 | A |   | 3/1982 | Jeschke et al. |
| 4,433,964 | A | * | 2/1984 | Holtzberg et al. ........... 474/152 |
| 4,551,083 | A | * | 11/1985 | HOffman .................... 418/61.2 |
| 4,553,426 | A |   | 11/1985 | Capurka |
| 4,638,224 | A | * | 1/1987 | Gritter ......................... 318/254 |
| 4,742,332 | A |   | 5/1988 | Schroeder et al. |
| 5,131,366 | A |   | 7/1992 | Rawlings et al. |
| 5,181,432 | A | * | 1/1993 | Allen ........................... 74/395 |
| 5,460,134 | A |   | 10/1995 | Ott et al. |
| 5,497,748 | A |   | 3/1996 | Ott et al. |
| 5,558,053 | A | * | 9/1996 | Tortul ....................... 123/90.17 |

FOREIGN PATENT DOCUMENTS

| DE | 1936301 | * | 1/1971 |
| DE | 2633486 | * | 2/1978 |
| EP | 159616 | * | 10/1985 |
| FR | 2818174 | * | 12/2000 |
| GB | 0256016 A |   | 8/1926 |
| JP | 09159010 A |   | 6/1997 |
| WO | WO 81/00143 A |   | 1/1981 |

OTHER PUBLICATIONS

Rizzoni et al, "Crankshaft Position Measurement for Engine Testing, Control, and Diagnosis," 1989, IEEE, p. 423–436.*

* cited by examiner

Primary Examiner—Patrick Wamsley
(74) Attorney, Agent, or Firm—John J Cheek

(57) ABSTRACT

A timing apparatus comprises a gear, for example a camshaft gear, and a timing ring secured to one side of the gear. The timing ring has a number of equally spaced timing teeth which when used with a sensor provide information about the rotation of the gear. The gear has a generally cylindrical recess on one face of the gear, and the timing ring is secured within the recess. The timing teeth are arranged radially inwardly of the gear teeth, so that the timing teeth are protected from damage. The resulting timing apparatus is economic to manufacture and facilitates compact adaption to a rotating body of an engine.

25 Claims, 3 Drawing Sheets

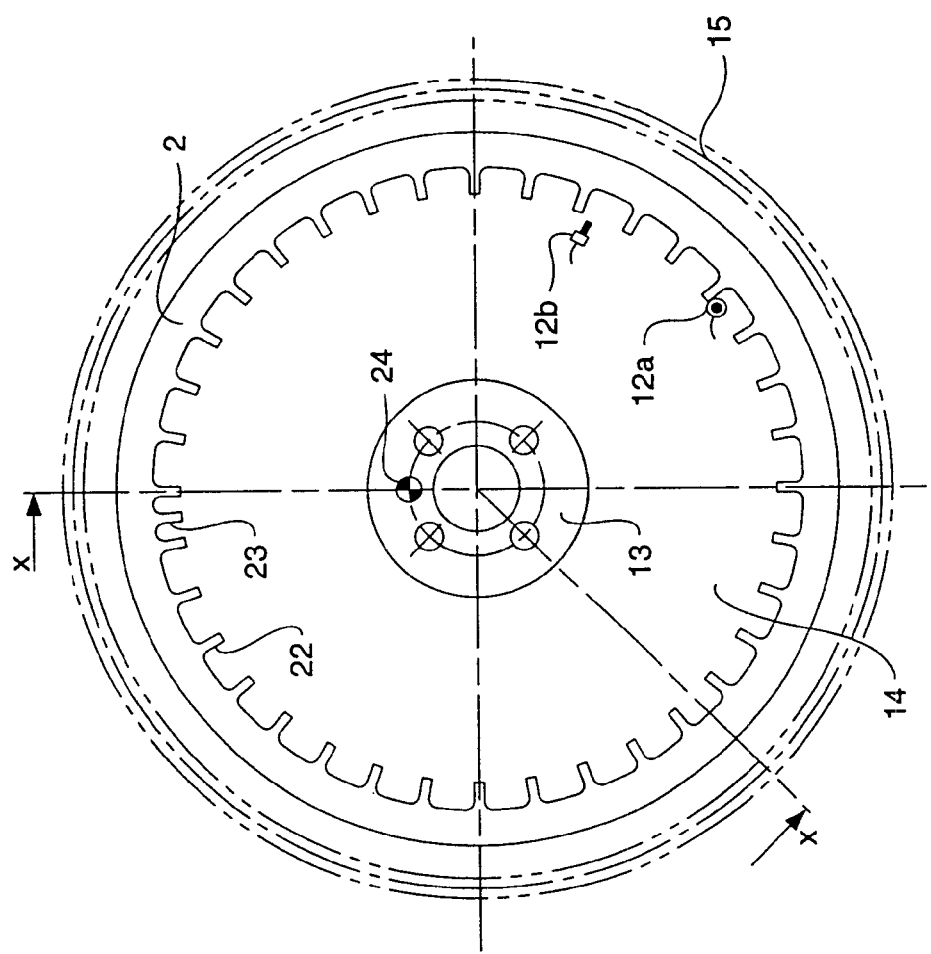
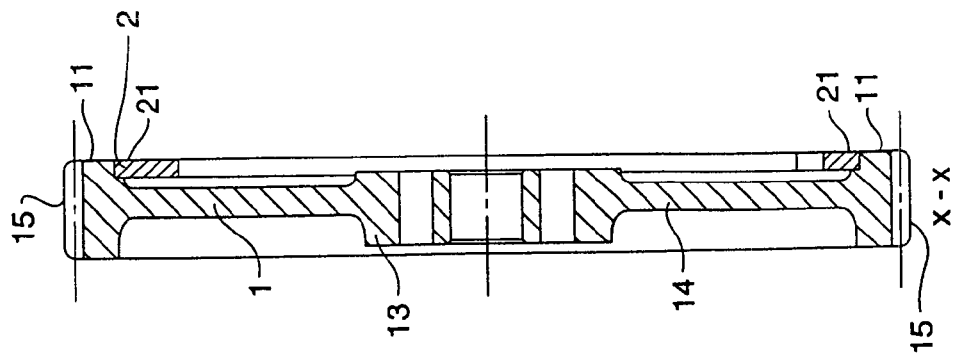

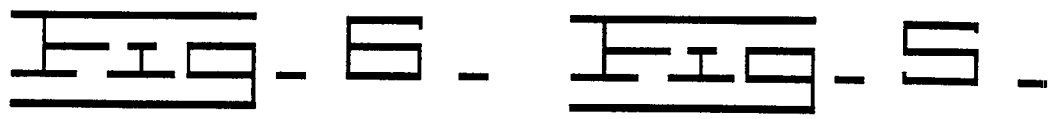
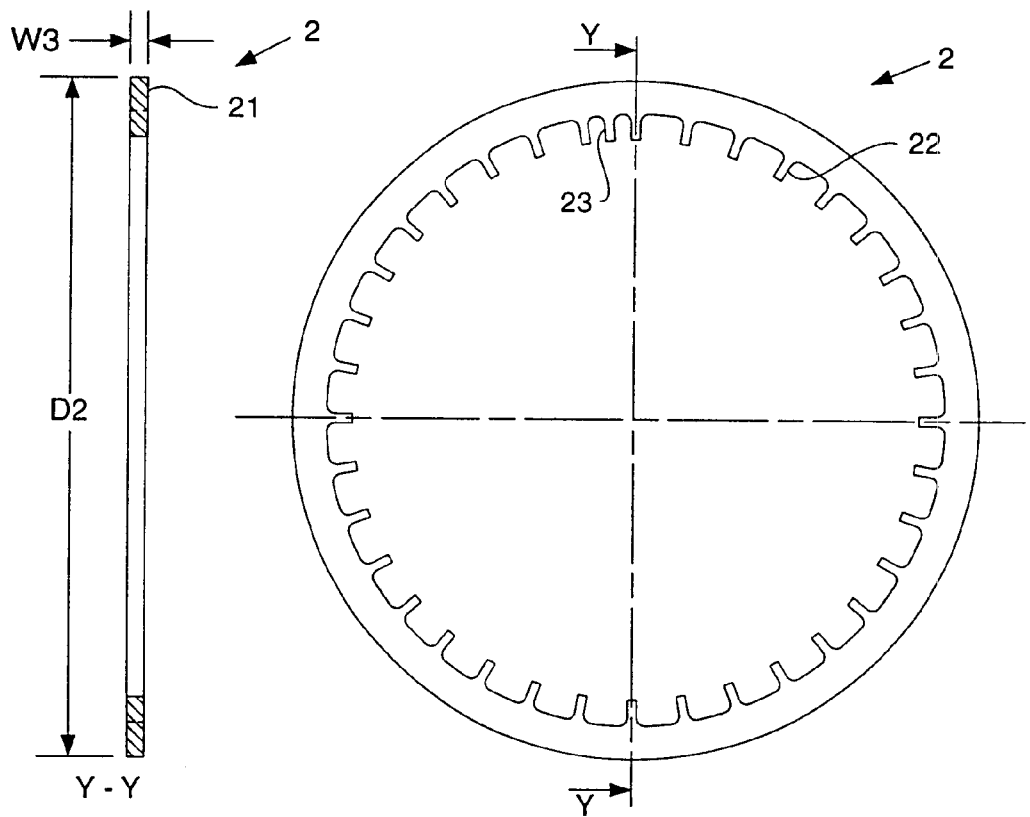

TIMING APPARATUS HAVING A GEAR INCORPORATING A TIMING RING AND METHOD OF MANUFACTURING THE SAME

TECHNICAL FIELD

The present invention relates generally to a device for detecting the angular position of a rotating part, and more particularly to a device incorporating a timing ring for detecting the angular position of a shaft of an internal combustion engine.

BACKGROUND

It is known to sense the rotational position and/or speed of a shaft, for example a crankshaft in an internal combustion engine, by means of a timing ring which rotates with the shaft, a perimeter of the timing ring comprising teeth which each create an impulse as they pass an electrical sensor. The sensor output is an essential element of engine management systems. It is also known for the timing ring to be additionally provided with a variation in the teeth at one or more points so that the sensor can detect the rotational position (angle) of the shaft at a precise instant in time. Examples of such known timing rings may be seen in U.S. Pat. No. 4,233,592, U.S. Pat. No. 4,742,332 and U.S. Pat. No. 5,497,748.

However, in an internal combustion engine, auxiliary drives taken from the front end of the crankshaft and transmissions or generators driven from the rear end limit the space available for installing the timing ring and its associated sensor.

Further, even where space can be allocated for the timing ring and sensor, it can be difficult to gain access to retain a crankshaft driven timing ring with threaded fasteners or the like, and the process can be time consuming and costly both in component manufacture and in subsequent fitment to the engine. However, non-permanent fastening, for instance with threaded fasteners, may be necessary in conventional apparatus to allow the timing ring to be removed for certain aspects of engine servicing or for replacement of the timing ring, for example after accidental damage to the timing ring teeth.

A further problem may arise in attempting to fit a timing ring to an engine in a location offering protection to the teeth from accidental damage, which could result in incorrect rotational sensing, and ensuring that the rotating timing ring will not pose a danger to engine operators or other personnel who may venture into the vicinity when the engine is in operation. These problems may be overcome by enclosing the timing ring in a dedicated enclosure, but this will increase the manufacturing cost of the engine and may also be physically difficult to incorporate into the engine.

A known alternative or addition to driving the timing ring directly from the crankshaft is to rotatingly drive it from a camshaft. U.S. Pat. No. 5,460,134 shows a system where timing rings (discs) are driven from both crankshaft and camshaft. A timing ring driven by a camshaft provides the benefit, in a four-stroke engine, of the timing ring turning one complete revolution per 720° of crankshaft rotation. Thus a single marker tooth can uniquely signify each repeat of an in-cylinder combustion event since these events occur every 720° of crankshaft revolution. Conversely, a crankshaft-driven timing ring cannot distinguish between the different events that occur alternatingly every 360° degrees of crankshaft rotation. However, installation, access and other problems similar to those related above in relation to crankshaft-driven timing rings may also be experienced with camshaft-driven timing rings.

It is desirable to provide a timing ring apparatus and method of assembly to an engine which will obviate or mitigate the problems identified above.

The present invention is directed to overcoming one or more of the problems as set forth above.

SUMMARY OF THE INVENTION

In one aspect of the present invention there is provided a timing apparatus having a gear and a timing ring. The gear has a first face, a second face, an outer toothed portion having a first width and an inner web portion having a second width and the gear having a generally cylindrical recess on the first face of the gear. The timing ring is secured within the recess.

in another aspect of the present invention, a timing apparatus has a gear having gear teeth and a first face. A timing ring is located on the first face of the gear and has a plurality of circumferentially spaced timing teeth adapted to provide rotational and/or positional data to a timing sensor. The timing teeth are arranged radially inwardly of the gear teeth.

In yet another aspect of the present invention, a timing apparatus has a gear having a first face, a second face, an outer toothed portion having a first width, an inner web portion having a second width less than the first width. A generally cylindrical recess is disposed on the first face of the gear. A timing ring is disposed within the recess and connected to the gear.

BRIEF DESCRIPTION OF THE DRAWINGS

By way of example, the invention will be described with reference to the accompanying drawings, of which:

FIG. 1 is a diagrammatic end view of an embodiment of the present invention showing a camshaft gear and timing ring apparatus;

FIG. 2 is a diagrammatic cross-sectional view taken along lines X—X through the apparatus of FIG. 1;

FIG. 5 is a diagrammatic end view of a timing ring prior to assembly with the camshaft gear of FIG. 4, and FIG. 6 is a diagrammatic cross-sectional view taken along lines Y—Y through the timing ring of FIG. 5.

DETAILED DESCRIPTION

Figure 3:
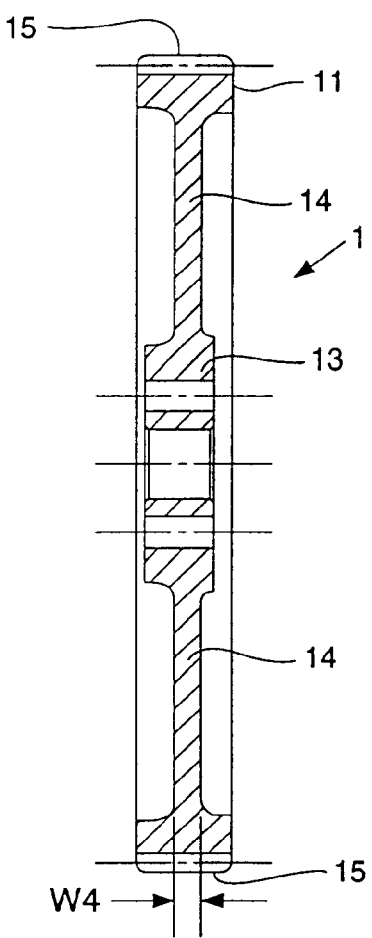
FIG. 3 is a diagrammatic cross-sectional view of a camshaft gear prior to modification.

Referring to the drawings, FIGS. 1 and 2 show a timing apparatus according to an embodiment of the present invention, comprising a gear such as a camshaft gear 1 having a rotational axis to which has been assembled a timing ring 2 in a manner to be described.

Figure 4:
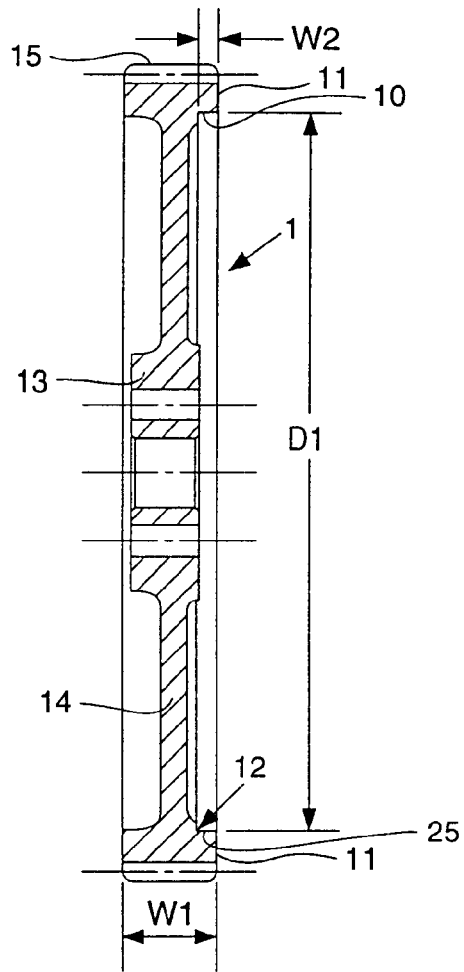
FIG. 4 is a diagrammatic cross-sectional view of a camshaft gear subsequent to modification.

A camshaft gear 1 of conventional construction, shown as FIG. 3, is adapted to house an annular member type timing ring 2 by the machining of a simple generally cylindrical recess 10 in a first or front face 11 as shown in FIG. 4. The recess 10, for receiving the timing ring 2, can alternatively be provided in a second or rear face of the gear. The gear 1 is provided with an outer toothed portion in the form of gear teeth 15. The toothed portion or gear teeth 15 defines a first width W1 of the gear 1. The conventional gear design provides a boss 13 and a radial web 14 having a second width W4, such that no machining of the boss 13 or web 14 is necessary to form a recess 10 of the depth shown in FIGS. 2 and 4. The recess 10 can thus be formed economically. The recess 10 has a side wall 25 which is substantially perpendicular to the plane of rotation of the gear.

FIGS. 5 and 6 show the timing ring 2 prior to its assembly with the camshaft gear 1. The timing ring 2 has an outer diameter D2 corresponding to the diameter D1 of the recess 10 in the camshaft gear 1. Likewise, the timing ring 2 has a width W3 corresponding to the depth W2 of the recess 10 in the camshaft gear 1, so that the outer surface 21 of the timing ring 2 is coplanar with the outer surface 11 of the gear 1 in the area of the gear teeth 15. Alternatively, the timing ring 2 may have a width W3 less than or greater than the depth W2 of the recess 10 in the gear 1 and, if greater, may if required be machined flush such that the outer surface 21 of the timing ring 2 is coplanar with the outer surface 11 of the gear 1 subsequent to assembly of the gear and timing ring by a method to be described herein.

The timing ring 2, of the embodiment shown, has a plurality of, in this embodiment, 36 teeth 22 of uniform width in the circumferential direction for engine speed sensing, and thus each tooth 22 will represent 10° of camshaft rotation and hence 20° of crankshaft rotation. The 36 teeth 22 are equally spaced circumferentially around the annular timing ring 2. The timing ring 2 is provided with an irregularity 23 in the spaced teeth 22 in the form of an additional marker tooth 23 between two teeth 22 to provide rotational position sensing. Sensing may be carried out by a conventional pulse sensor positioned with its pick-up head 12a, 12b in close proximity to the path taken by the teeth 22, 23 when the timing ring 2 is rotating with the camshaft gear 1. The sensing may alternatively be axial or radial in relation to the timing ring, as shown by the two alternative pick-up head positions 12a, 12b in FIG. 1. The head 12a is positioned axially in relation to the teeth, while the head 12b is positioned radially.

As will be appreciated by those skilled in the art, in alternative embodiments, the irregularity 23 can comprise a missing tooth, an extra wide tooth, a short tooth etc, as required.

The timing ring 2 is secured within the recess 10. The timing ring 2 may be introduced into the recess 10 in the camshaft gear 1 before the gear is fitted to a camshaft (not shown), thus providing a pre-assembled apparatus. Alternatively, the timing ring 2 may be introduced into the recess 10 subsequent to the gear and camshaft being fitted to the engine (not shown).

The position of the sensor 12a, 12b may be adjusted by conventional means in relation to the fitted gear and timing ring, before the engine is brought into operation, to provide an accurate timing datum. A gear-positioning device such as a dowel 24 ensures accurate rotational positioning of the gear 1 and timing ring 2 subsequent to any future removal of the gear 1 from the engine.

The timing ring may be retained within the gear semi-permanently using a suitable fixing means, such as an anaerobic retaining compound, applied to the recess 10. A suitable compound is that sold under the Trade Mark Loctite 603. If disassembly should subsequently be required, this may be facilitated by heating the compound to a temperature, typically 200° C., at which the strength of the compound will diminish sufficiently for non-destructive dismantling of the apparatus.

In alternative embodiments of the invention, other suitable fixing means may be employed e.g. a push fit arrangement defined between the timing ring 2 and the gear 1.

The camshaft gear 1 and timing ring 2 may alternatively be produced as a unitary item, though in this case non-destructive dismantling will not be possible.

The teeth 22, 23 of the timing ring may be laser-cut to assist their positional accuracy, this being relatively more important for a timing ring driven at half engine-speed than for a timing ring driven at full engine speed. Alternative precision machining methods such as fine blanking may be used. It should be noted that any backlash between the crankshaft and the camshaft may affect the positional accuracy of the timing ring.

The teeth 22, 23 are oriented at any angle in the timing ring 2 adapted to facilitate sensing in the present embodiment, by the sensor 12a, 12b. In the present embodiment, the teeth 22, 23 are arranged radially inwardly of the gear toothed portion 15. In particular, the teeth 22, 23 are formed to project radially inwardly as shown, a benefit of which is a certain amount of protection from accidental damage, particularly when the timing ring is housed within the camshaft gear. However, the teeth 22, 23 may be arranged in other orientations e.g. the teeth 22, 23 may be oriented so that their longitudinal axes are parallel to the rotational axis of the gear 1. Alternatively, if required, the teeth 22, 23 may be hook-shaped i.e. provided with a radially inwardly projecting portion, a portion disposed parallel with the rotational axis of the gear 1 and a return portion disposed parallel with the radially inwardly projecting portion.

Industrial Applicability

In operation, the timing apparatus of the invention can be employed in internal combustion engines in general and if desired adapted for use with particular engine types. For example, in a diesel engine, the timing ring could alternatively be housed in a fuel pump gear (not shown but similar in form to the shown camshaft gear 1) or any other gear which rotates at half or full crankshaft speed or multiples thereof.

The timing ring 2 may alternatively be housed in any other rotating component, such as an engine flywheel, though the convenience of the preferred apparatus as shown in the drawings relating to the camshaft gear 1, where a suitable recess is a largely already provided as part of a conventional engine gear design, is unlikely to be achieved in such alternative apparatus. Further, care has to be taken to ensure that the location of the sensor avoids interference from, for example, an energized starter motor which may corrupt the pulse being sensed.

If required, the apparatus can be used in conjunction with a second sensing means (not shown) for failsafe operation or for initial calibration of the engine management system. The second sensing means may be associated with any of the rotating means on the engine as described by way of the examples in the preceding paragraph.

The orientation of the plurality of radially inwardly projecting timing teeth 22,23 arranged radially inwardly of the gear toothed portion 15 provides protection against accidental damage during assembly and maintenance. Alternatively, the timing teeth 22,23 may be oriented parallel with the rotational axis of the gear 1 and still be protected by this location.

Preferably the timing teeth 22,23 have a uniform width. Preferably the timing teeth are equally spaced around the annular member. The timing ring may be provided with a marker tooth 23 which is not regularly spaced to provide rotational position sensing.

Preferably the recess 10 has a side wall 11 which is substantially perpendicular to the plane of rotation of the gear 1. Preferably the depth of the recess W2 is substantially equal to or greater than the width W3 of the timing ring 2.

The timing ring 2 may be retained within the recess 10 by a fixing means. Preferably the fixing means comprises an anaerobic retaining compound adapted to be releasable upon application of sufficient heat. Alternatively the timing ring 2 may be formed integrally with the gear 1.

Suitably, the timing apparatus further has a sensor adapted to detect the passage of the timing teeth 22,23.

In another embodiment of the present invention, there is provided a timing apparatus with a gear 1 having a timing ring 2 on a first face thereof. The timing ring 2 has a plurality of spaced timing teeth 22,23 adapted to provide rotational and/or positional data to a timing sensor. Preferably the gear 1 has gear teeth 15 and the timing teeth 22,23 are arranged radially inwardly with respect to the gear teeth 15.

Preferably the timing teeth 22,23 project radially inwardly. Such orientation of the timing teeth 22,23 provides protection against accidental damage during assembly and maintenance. Alternatively the timing teeth 22,23 may be oriented parallel with the rotational axis.

Preferably the timing teeth 22 have a uniform width in the circumferential direction. Preferably the teeth are equally spaced circumferentially. The timing ring 2 may be provided with an irregularity to provide rotational position sensing. Suitably, the irregularity comprises a marker tooth 23. Alternatively, the irregularity comprises a missing tooth, an extra wide tooth or a short tooth.

Preferably the timing teeth 22,23 do not extend in the axial direction beyond the extent of the gear teeth and the first side faces 11 of the gear teeth 15 are substantially coplanar with the first side faces 21 of the timing teeth 22,23.

Preferably the gear 1 has a central boss portion 13, an outer gear tooth portion 15 and a radial web portion 14 which connects the central boss portion 14 with the outer gear tooth portion 15. Preferably the timing teeth 22,23 are spaced in an axial direction from the radial web portion 14.

The invention also provides a timing apparatus having a gear 1 and a timing ring 2. The gear 1 has a first face, a second face, an outer toothed portion 15 having a first width W1, an inner web portion 14 having a second width W2 less than the first width W1, such that the gear has a generally cylindrical recess 10 on the first face 11 of the gear 1 wherein the timing ring 2 is secured within the recess 10. Suitably the second width W2 is less than the first width W1. Preferably, the gear 1 is a camshaft gear.

The present invention provides a timing ring apparatus which is economic to manufacture and facilitates compact adaptation to a rotating body of an engine. The timing ring apparatus poses a minimal risk of damage to the engine during operation. Furthermore, the invention facilitates an economic method for semi-permanently adapting a timing ring to a rotating body in an engine.

Other aspects, objects and advantages of this invention can be obtained from a study of the drawings, the disclosure and the appended claims.

What is claimed is:

1. A timing apparatus comprising:
    a gear having a first face, a second face, an outer toothed portion having a first width, and an inner web portion having a second width, said gear having a generally cylindrical recess disposed in the first face of the gear; and
    a timing ring being disposed in the recess and secured to the gear.

2. A timing apparatus according to claim 1, wherein the timing ring includes an annular member having a plurality of projecting timing teeth.

3. A timing apparatus according to claim 2, wherein the timing teeth are arranged radially inwardly of the gear toothed portion.

4. A timing apparatus according to claim 3, wherein the timing teeth project radially inwardly.

5. A timing apparatus according to claim 2, wherein the timing teeth are equally spaced around the annular member.

6. A timing apparatus according to claim 2 including a sensor adapted to detect the passage of the timing teeth.

7. A timing apparatus according to claim 1, wherein the timing ring is retained within the recess by a fixing means.

8. A timing apparatus according to claim 7 wherein the fixing means comprises an anaerobic retaining compound.

9. A timing apparatus according to claim 1, wherein the second width is less than the first width.

10. A timing apparatus according to claim 1, wherein the recess has a side wall which is substantially perpendicular to a plane of rotation of the gear.

11. A timing apparatus according to claim 1, wherein the depth of the recess is substantially equal to a width of the timing ring.

12. A timing apparatus comprising:
    a gear having gear teeth and a first face;
    a timing ring located on the first face of the gear, said timing ring having a plurality of circumferentially spaced timing teeth adapted to provide rotational and/or positional data to a timing sensor, said timing teeth being arranged radially inwardly of the gear teeth.

13. A timing apparatus according to claim 12, wherein the timing teeth do not extend in the axial direction beyond the extent of the gear teeth.

14. A timing apparatus according to claim 13, wherein a first side face of the gear teeth are substantially coplanar with a first side face of the timing teeth.

15. A timing apparatus according to claim 12, wherein the timing teeth project radially inwardly.

16. A timing apparatus according to claim 12, wherein the timing teeth are oriented parallel with a rotational axis of the gear.

17. A timing apparatus according to claim 12, wherein the timing teeth are equally spaced circumferentially.

18. A timing apparatus, comprising:
    having a first a gear having a first face, a second face, an outer toothed portion having a first width, an inner web portion having a second width less than the first width, such that the gear has a generally cylindrical recess on the first face of the gear; and
    a timing ring being secured within the recess.

19. A method of manufacturing a timing apparatus, comprising:
    providing a gear having a face, and outer toothed portion, and a recess formed in the face;
    positioning a timing ring within the recess; and
    securing the positioned timing ring to the gear within the recess.

20. The method of claim 19 wherein the timing ring comprises an annular member having plurality of projecting timing teeth.

21. The method of claim 20 wherein the securing step includes securing the timing ring in the recess such that the timing teeth are arranged radially inwardly of the outer toothed portion of the gear.

22. The method of claim 21 wherein the securing step includes securing the timing ring in the recess such that the timing teeth project radially inwardly.

23. The method of claim 19 wherein the securing step includes securing the timing ring in the recess using an adhesive compound.

24. The method of claim 19 wherein the securing step includes securing the timing ring in the recess using a push fit arrangement.

25. The method of claim 19 wherein the recess is generally cylindrical.

\* \* \* \* \*

UNITED STATES PATENT AND TRADEMARK OFFICE
CERTIFICATE OF CORRECTION

PATENT NO. : 6,549,146 B2
DATED : April 15, 2003
INVENTOR(S) : Geoffrey Paul Bailey It is certified that error appears in the above-identified patent and that said Letters Patent is hereby corrected as shown below:

<u>Column 6,</u>
Line 49, delete the first instance of "having a first" so the line reads -- a gear having a first face, a second face, an --

Signed and Sealed this

Ninth Day of September, 2003

JAMES E. ROGAN
*Director of the United States Patent and Trademark Office*